United States Patent
Inzirillo et al.

(10) Patent No.: US 11,587,165 B2
(45) Date of Patent: *Feb. 21, 2023

(54) ON-DEMAND AUCTION

(71) Applicant: Cboe Exchange, Inc., Chicago, IL (US)

(72) Inventors: Adam Inzirillo, Bay Shore, NY (US); William Ciabattoni, New York, NY (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,594

(22) Filed: Mar. 1, 2021

(65) Prior Publication Data
US 2021/0272197 A1    Sep. 2, 2021

Related U.S. Application Data

(60) Provisional application No. 62/983,289, filed on Feb. 28, 2020, provisional application No. 62/983,320, filed on Feb. 28, 2020.

(51) Int. Cl.
*G06Q 20/04* (2012.01)
*G06Q 40/04* (2012.01)
*G06F 9/54* (2006.01)
*G06F 7/58* (2006.01)

(52) U.S. Cl.
CPC ............. *G06Q 40/04* (2013.01); *G06F 7/582* (2013.01); *G06F 9/542* (2013.01)

(58) Field of Classification Search
None
See application file for complete search history.

(56) References Cited

U.S. PATENT DOCUMENTS

| 7,428,506 B2 * | 9/2008 | Waelbroeck ......... G06Q 40/025 |
| | | 705/37 |
| 7,873,561 B1 | 1/2011 | Adcock et al. |
| 7,921,054 B2 | 4/2011 | Balabon |
| 8,010,415 B2 | 8/2011 | Friedland et al. |

(Continued)

FOREIGN PATENT DOCUMENTS

WO    WO 2010085746    7/2010

OTHER PUBLICATIONS

"Nick Bakerand Bryan Gruley, The Gazillion-Dollar Standoff Over Two High-Frequency Trading Towers, Bloomberg, Mar. 8, 2019" (Year: 2019).*

(Continued)

*Primary Examiner* — Kito R Robinson
*Assistant Examiner* — Toan Duc Bui
(74) *Attorney, Agent, or Firm* — Fish & Richardson P.C.

(57) ABSTRACT

A method for performing an auction implemented via an exchange computer system, including receiving, from a user device, a security transaction order, receiving a first matching order, initiating a delay timer that runs for a first period of time, determining that the first period of time has expired, initiating an auction timer that runs for a second period of time, receiving, during the second period of time, one or more additional matching orders, wherein each of the one or more additional matching orders includes a request for participation in the auction, determining that the second period of time has expired, and facilitating a transaction based on the security transaction order.

35 Claims, 6 Drawing Sheets

(56) References Cited

U.S. PATENT DOCUMENTS

| | | | |
|---|---|---|---|
| 8,108,299 B1 | 1/2012 | Waelbroeck et al. | |
| 8,200,568 B2 | 6/2012 | Renton et al. | |
| 8,266,045 B2 | 9/2012 | Waelbroeck | |
| 8,271,375 B2 | 9/2012 | Mahoney et al. | |
| 8,380,610 B1 | 2/2013 | Nagle et al. | |
| 8,442,859 B1 | 5/2013 | Broms et al. | |
| 8,620,759 B1 | 12/2013 | Virgilio et al. | |
| 9,953,365 B2 * | 4/2018 | Friedman | G06Q 30/0275 |
| 10,269,067 B2 | 4/2019 | Suminski et al. | |
| 10,304,132 B2 * | 5/2019 | Suminski | G06Q 40/04 |
| 10,417,698 B2 * | 9/2019 | Tisler | G06Q 30/08 |
| 10,614,801 B2 | 4/2020 | Filev | |
| 11,023,971 B2 | 6/2021 | Lutnick et al. | |
| 11,030,689 B2 | 6/2021 | Suminski et al. | |
| 11,170,442 B2 | 11/2021 | Suminski et al. | |
| 2006/0026090 A1 | 2/2006 | Balabon | |
| 2006/0031157 A1 | 2/2006 | Gianakouros et al. | |
| 2006/0259391 A1 | 11/2006 | Schoen et al. | |
| 2008/0015974 A1 | 1/2008 | Balabon | |
| 2008/0259391 A1 | 10/2008 | Maruo et al. | |
| 2008/0306864 A1 | 12/2008 | Foley et al. | |
| 2009/0024512 A1 | 1/2009 | Reid | |
| 2009/0070250 A1 | 3/2009 | Adcock et al. | |
| 2009/0144187 A1 | 6/2009 | Borkovec et al. | |
| 2009/0210337 A1 | 8/2009 | Mahoney et al. | |
| 2009/0259584 A1 | 10/2009 | Waelbroeck et al. | |
| 2010/0076886 A1 | 3/2010 | Adams et al. | |
| 2010/0174654 A1 | 7/2010 | Foley et al. | |
| 2012/0022994 A1 | 1/2012 | Conary et al. | |
| 2012/0078775 A1 | 3/2012 | Callahan | |
| 2012/0246005 A1 | 9/2012 | Horstemeyer | |
| 2013/0006828 A1 | 1/2013 | Dale et al. | |
| 2013/0013487 A1 | 1/2013 | Sellberg et al. | |
| 2014/0136395 A1 | 5/2014 | Dowling | |
| 2014/0149273 A1 | 5/2014 | Angell et al. | |
| 2014/0188688 A1 | 7/2014 | Crutchfield et al. | |
| 2015/0095209 A1 | 4/2015 | Adcock et al. | |
| 2015/0356678 A1 | 12/2015 | Schmitt | |
| 2021/0272196 A1 | 9/2021 | Inzirillo et al. | |

OTHER PUBLICATIONS

PCT International Search Report and Written Opinion in International Appln. No. PCT/US2021/020288, dated Jun. 15, 2021, 13 pages.

Jeffs [online], "Dark Pools of Liquidity Come Into the Light," Financial News, Oct. 1, 2007, retrieved on Aug. 23, 2022, retrieved from URL: <https://www.fnlondon.com/articles/dark-pools-of-liquidity-come-into-the-light-20071001>, 9 pages.

Johnson, "Regulating Innovation: High Frequency Trading in Dark Pools," Journal of Corporation Law, 42(2), Oct. 2017, 54 pages.

Wallman, "Technology Takes to Securities Trading," IEEE Spectrum, Feb. 1997, 34(2):60-65.

International Preliminary Report on Patentability in International Appln. No. PCT/US2021/020288, dated Sep. 9, 2022, 11 pages.

* cited by examiner

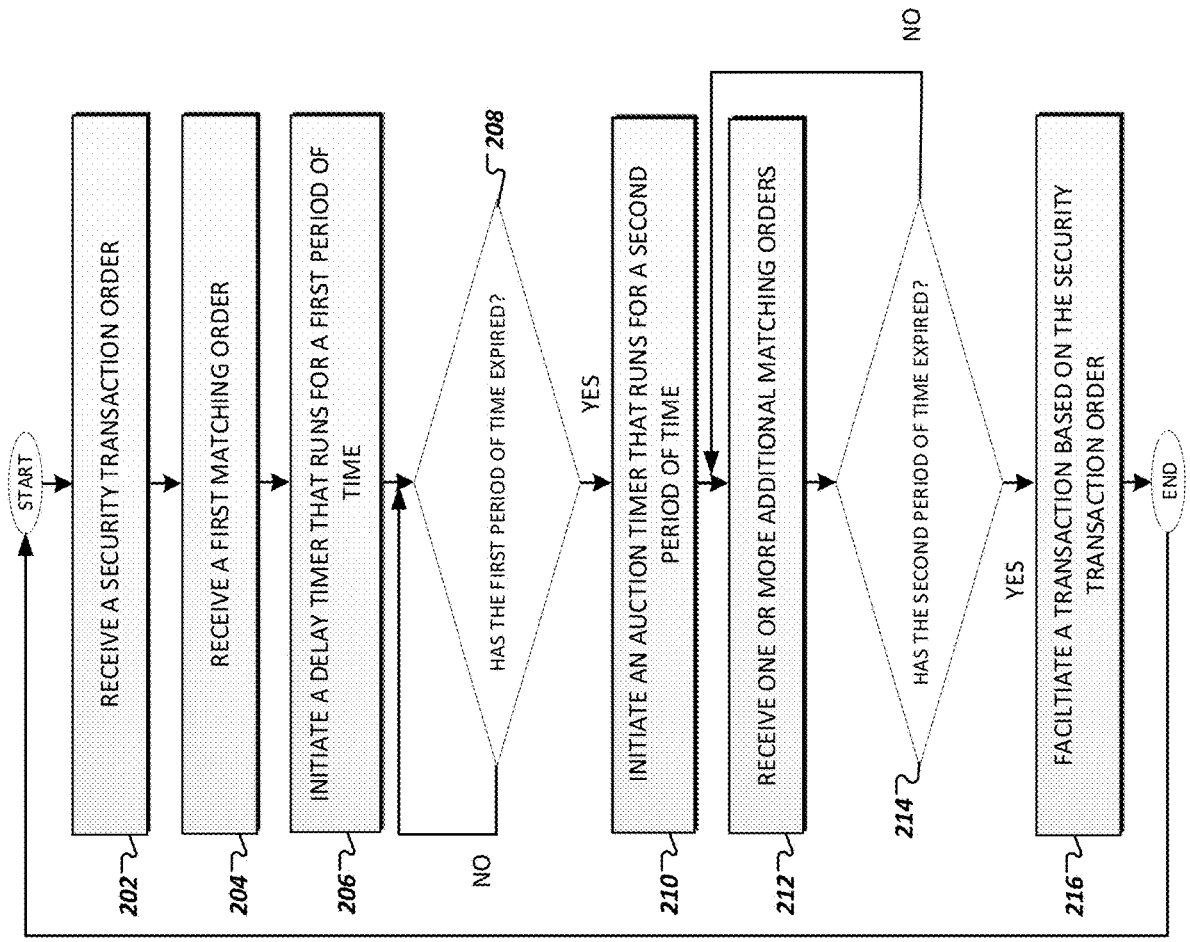

ON-DEMAND AUCTION

CROSS-REFERENCE TO RELATED APPLICATIONS

This application claims the benefit of U.S. Provisional Patent Application No. 62/983,289, filed Feb. 28, 2020, and U.S. Provisional Patent Application No. 62/983,320, filed Feb. 28, 2020, each of which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO) (also known as first-come-first-served (FCFS)).

Within trading environments such as these, some market participants have sought advantage over others through the use of sophisticated computer algorithms that can analyze market conditions and react to changes by placing large volumes of orders at relatively high speeds—typically, within fractions of a second of a detected change. Such traders also often invest large sums in cutting-edge computer systems that can process and send orders at the highest possible speed. Similarly, traders invest significant resources on the fastest network connections and place their computers as close to the exchange as possible to reduce all possible communications latency between their computers and the exchange. Not all traders have access to these resources, which command massive capital to obtain; accordingly, where there is an objective not to reward the traders with the fastest algorithms, computers, and network connections, there is a need for technology that reduces the advantages possessed by some traders over others.

SUMMARY

The disclosure that follows relates to on-demand auctions implemented via an exchange computer system. The disclosed technology enables market participants to opt in to a system that minimizes the advantages enjoyed by certain traders simply because of their possession of technology that allows them to send orders to the exchange faster than other traders.

In one aspect, a method for performing an auction implemented via an exchange computer system includes receiving, from a user device, a security transaction order, and receiving a first matching order. The method includes initiating a delay timer that runs for a first period of time, determining that the first period of time has expired, and initiating an auction timer that runs for a second period of time. The method includes receiving, during the second period of time, one or more additional matching orders that include a request for participation in the auction, determining that the second period of time has expired, and facilitating, by one or more processors, a transaction based on the security transaction order.

The security transaction order can include an auction request. The delay timer that runs for a first period of time can be initiated in response to receiving the security transaction order. Alternatively, the delay timer that runs for a first period of time can be initiated in response to receiving the first matching order.

A length of the first period of time can be predetermined. Alternatively, the method can include determining a length of the first period of time based on a pseudorandom process, a trading day, and/or one or more parameters associated with the security transaction order. A length of the second period of time can be predetermined. Alternatively, the method can include determining a length of the second period of time based on a pseudorandom process, a trading day, and/or one or more parameters associated with the security transaction order.

The determination that the first period of time has expired can be based on the delay timer, and the auction timer that runs for a second period of time can be initiated in response to determining that the first period of time has expired. The determination that the second period of time has expired can be based on the auction timer, and the transaction based on the security transaction order can be facilitated in response to determining that the second period of time has expired.

The method can include reinitiating the auction timer in response to each of the one or more additional matching orders received during the second period of time. The method can include receiving, during a third period of time, one or more supplementary matching orders and holding each of the of the one or more supplementary matching orders received during the third period of time for a supplementary auction. A length of the third period of time can be determined based on a length of the second period of time. The first matching order can be received during the second period of time.

Facilitating a transaction based on the security transaction order can include determining a price of the first matching order, determining a price of each of the one or more additional matching orders received during the second period of time, selecting a matching order based on price, and executing the transaction based on the security transaction order and the selected matching order. The selected matching order can be selected from the group consisting of the first matching order and the one or more additional matching orders received during the second period of time.

The exchange computer system can be a distributed computer system that includes an order routing system, an order matching system, and an auction engine.

In another aspect, a method for performing an auction implemented via an exchange computer system includes receiving a security transaction order that includes an auction request from a user device, and receiving a first matching order. Receiving the first matching order can include receiving an order, identifying a price of the order based on information that is associated with the order, and determining, based on the price of the order, that the order matches the security transaction order. The method can include, in response to receiving the first matching order, initiating a first delay timer that runs for a first period of time, and determining, based on the delay timer, that the first period of time has expired. The method can include, in response to determining that the first period of time has expired, initiating an auction timer that runs for a second period of time, receiving, during the second period of time, one or more additional matching orders, and determining, based on the auction timer, that the second period of time has expired. The method can include, in response to determining that the second period of time has expired, determining a price of the first matching order, determining a price of each of the one or more additional matching orders received during the second period of time, selecting a matching order based on price, and executing the transaction based on the security transaction order and the selected matching order.

Determining a price of the first matching order can include identifying the price of the first matching order based on information that is associated with the first matching order. Determining a price of each of the one or more additional matching orders received during the second period of time can include, for each of the one or more additional matching orders received during the second period of time, identifying a price of the additional matching order based on information that is associated with the additional matching order.

In another aspect, a method for performing auctions implemented via an exchange computer system includes receiving a first security transaction order from a user device, and receiving a first matching order. The method can include, subsequent to receiving the first matching order, initiating an auction timer that runs for a first period of time, receiving, during the first period of time, one or more additional matching orders, determining that the first period of time has expired, and facilitating, by one or more processors, a transaction based on the security transaction order. The method can include receiving a second security transaction order, receiving a second matching order, and, subsequent to receiving the second matching order, initiating an auction timer that runs for a second period of time. The method can include receiving, during the second period of time, one or more additional matching orders, determining that the second period of time has expired, and facilitating a transaction based on the second security transaction order. At least a portion of the second period of time can occur during the first period of time.

The method can include receiving, during a third period of time, one or more supplementary matching orders, where at least a portion of the third period of time occurs during the first period of time. A length of the third period of time can be determined based on a length of the first period of time. Facilitating a transaction based on the second security transaction order can include determining a price of the second matching order, determining a price of each of the one or more additional matching orders received during the second period of time, determining a price of each of the one or more supplementary matching orders received during the third period of time, selecting a matching order based on price, and executing the transaction based on the second security transaction order and the selected matching order.

The selected matching order can be selected from the group consisting of the second matching order, the one or more additional matching orders received during the second period of time, and the one or more supplementary matching orders received during the third period of time.

In another aspect, a method for performing an auction implemented via an exchange computer system includes maintaining an auction timer, receiving, from a user device, a security transaction order, and receiving a first matching order. The method can include initiating a delay timer that runs for a first period of time, determining that the first period of time has expired, and determining a second period of time based on the auction timer. The method can include receiving, during the second period of time, one or more additional matching orders, determining that the second period of time has expired, and facilitating, by one or more processors, a transaction based on the security transaction order.

Determining a second period of time based on the auction timer can include determining a time remaining from the auction timer, comparing the time remaining to a threshold value, and setting the second period of time to the time remaining. The time remaining can be less than or greater than the threshold value. Determining a second period of time based on the auction timer can include determining a time remaining from the auction timer, comparing the time remaining to a threshold value, and setting the second period of time to the time remaining plus an additional period of time.

Certain implementations may provide various advantages. For example, the implementation of on-demand auction via an exchange computer system deemphasizes the importance of order entry speed in trading, thereby promoting fairness. In a continuous trading format, if one user's order arrives after another's, even if only by a fraction of a second, the late-arriving order may never execute, or may execute at a worse price. By conducting an auction that allows orders to accumulate during a period of time, as opposed to continuously trading, the system can ensure that the best-priced orders received during the period trade; not necessarily the orders that were first to arrive. By enabling users to opt in to an auction system on an order-by-order basis, the system provides a means for users to protect themselves against technology advantages possessed by others.

Users of complex trading algorithms might attempt to retain their advantages by tuning their algorithms based on predicted auction start times and lengths. As such, in some implementations, the system introduces unpredictability by varying the conditions in which auctions begin, delaying auction start times, randomizing auction start notifications, randomizing auction lengths, and/or introducing delays between periodic auctions.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIG. 2. is a diagram of an example process for executing an on-demand auction.

DETAILED DESCRIPTION

Figure 1:
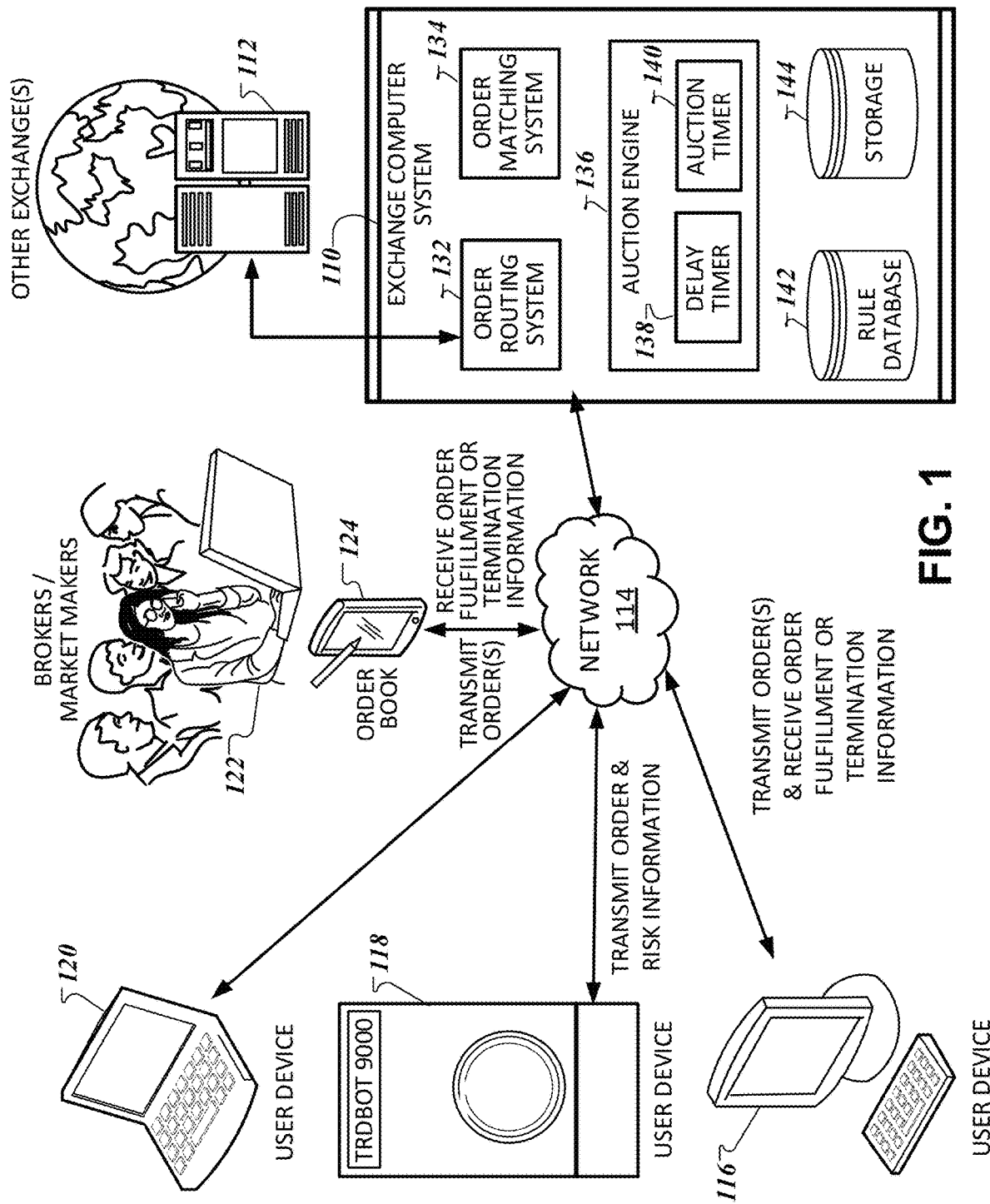
FIG. 1 is a diagram of an exchange computer system and associated networks, devices, and users.

FIG. 1 is a diagram of an exchange computer system and the associated networks, devices, and users that make up an exemplary trading environment in which that system operates. Generally, the term "user" may refer to any entity that interacts with the exchange computer system and/or associated networks and devices. Users may include, for example, market makers and other market professionals, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures, or other derivatives associated with an underlying asset.

Network 114 connects the various components within the trading environment, and is configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may be remote from the exchange computer system 110, and may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, an auction engine 136, a database of trading rules and algorithms 142, and storage 144. In some implementations, the exchange computer system 110 is a distributed computer system. The auction engine 136 may, for example, be separate from the OMS 134 and may interact with OMS 134 to facilitate trades. In other implementations, the OMS 134 and the auction engine 136 may be the same component of exchange computer system 110.

The order routing system (ORS) 132 determines whether a received order or quote is to be executed at the exchange computer system 110, or should instead be redirected to another exchange 112, and includes processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 includes processing systems that analyze and manipulate orders according to matching rules stored in the database 142. The OMS 134 may also include an electronic book (EBOOK) of orders and quotes with which incoming orders to buy or sell are matched, according to the matching rules. The EBOOK may also be implemented in a separate database such as storage 144, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The order matching system 134 may match orders based on priority determined through a variety of order priority rules. One such rule that is commonly implemented in electronic and hybrid exchanges is a first-come-first-served rule that gives priority to orders that are received by the exchange first in time, over orders that are received later in time.

The widespread implementation of the first-come-first-served rule has led some traders to seek advantage over others through the use of sophisticated computer algorithms that can analyze market conditions and react to changes by placing large volumes of orders at relatively high speeds—typically, within fractions of a second of a detected change. Similarly, some traders invest significant resources on cutting-edge computer systems that process and send orders at high speed, and on fast network connections that reduce communications latency between their computers and the exchange(s) on which they trade. In at least these ways, some traders leverage technological advantages that are not available to others, to ensure that their orders are received earlier in time, and are therefore systematically advantaged by the first-come-first-served rule.

To reduce the impact of these technological advantages and promote fairness, the exchange computer system 110 implements an auction engine 136 that is part of, or that interacts with, the OMS 134 to facilitate processes for the trading of financial instruments that deemphasize the importance of order entry speed. Auction engine 136 may, for example, conduct auctions in which orders accumulate during a period of time, as opposed to continuously trading, so as to ensure that the best-priced orders received during the period trade; not necessarily the orders that were received first. By enabling users to opt in to auctions on an order-by-order basis, the system provides a means for market participants to protect themselves against technological advantages possessed by others.

An auction-based trading format may, for example, be particularly desirable for traders who participate in the market via remote user devices that are physically distant from the exchange. Indeed, for remote device users in a continuous trading format, network latency is a serious concern. For example, the delay involved between the sending of an order and its receipt by the exchange, even if only a fraction of a second in length, may cause the delayed order to never execute, or to execute at a worse price. Auction engine 136 solves this and other problems by enabling remote device users to opt in to a trading format in which network latency plays little or no role in determining which orders execute.

Further, because algorithmic traders might attempt to retain their advantages by tuning their algorithms based on predicted auction start times and lengths, some implementations of auction engine 136 may also introduce unpredictability by varying the conditions in which auctions begin, delaying auction start times, randomizing auction start notifications, randomizing auction lengths, and/or introducing delays between periodic auctions.

The auction engine 136 may be implemented as part of a distributed exchange computer system, using a combination of software and hardware. The auction engine 136 may, for example, be implemented as one or more hardware processors configured to execute one or more algorithms, as described in further detail below.

The auction engine 136 may facilitate on-demand auctions involving orders received by ORS 132, and may work with OMS 134 to match orders for execution based on the facilitated auctions. The facilitated auctions may or may not occur periodically. The auction engine 136 may, for example, receive an order (e.g., a buy order for a security) that includes an auction request. Upon receipt of a matching order of an opposite type (e.g., a sell order for the same security), the auction engine 136 may immediately initiate an auction, or may instead initiate an auction following a period of delay. Orders for the security may accumulate during the auction's bidding period, and at the end of the period the auction engine 136 may execute a transaction based on the order that included the auction request, the matching order, and the orders that were received during the auction bidding period. As described above, the auction engine 136 may, for example, ensure that the best-priced orders received during the auction's bidding period trade; these best-priced orders may not necessarily be the orders that were received by the exchange computer system first in time.

The auction engine 136 can receive and accept various types of orders, and can receive and accept various types of additional trading instructions. The instructions can include parameters used by the auction engine 136 to execute auctions. Parameters can include, for example, order type, price, size, and duration (a length of time for which an order is valid).

The auction engine 136 may include a delay timer 138 that runs for a period of time that may be fixed or variable, so as to implement a period of delay between the receipt of an order including an auction request and the start of the auction. Alternatively, the delay timer 138 may be used to implement a period of delay between a first matching order and the start of the auction. The auction engine 136 may also use the delay timer 138 to implement periodic auctions with randomized delays between each auction.

The auction engine 136 may also include an auction timer 140 that runs for a period of time that may be fixed or variable. The period of time during which bidding occurs may, for example, vary from one auction to the next.

As noted above, algorithmic traders might attempt to retain their technological advantages by tuning their algorithms based on predicted auction start times and lengths. Accordingly, delay timer 138 and/or auction timer 140 may be implemented and/or configured in any of a variety of ways that enhance the unpredictability of the auctions facilitated through exchange computer system 110.

Delay and auction lengths and times may, for example, be determined based on pseudorandom process(es) involving (e.g., seeded by) any number of parameters, including parameters associated with one or more of the orders involved in a given auction, with the exchange and/or exchange computer system 110 on which the auction is administered, and/or with the larger trading environment in which exchange computer system 110 operates, including other devices with which exchange computer system 110 communicates over network 114.

In addition, or in the alternative, delay and auction times may be determined in truly random ways based on processes that are either internal or external to exchange computer system 110. Delay timer 138 and/or auction timer 140 may, for example, be triggered to start based on a random signal originating within exchange computer system 110 or received over network 114, and a length of time associated with either timer may similarly be set by internal or external signals.

The auction engine 136 may include a user interface in the form of an exchange account gateway through which a user can create orders. The auction engine 136 may transmit and receive associated information through network 114, to and from user devices 116, 118, 120, and 124. The exchange account gateway may, for example, be implemented through a Secure Web API and/or a dedicated user portal.

Storage 144 and database 142 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the auction engine 136. The auction engine 136 matches the buy side and sell side of a trade, and forwards the matched trade to a third party organization that verifies the proper clearance of the trade, such as the Options Clearing Corporation (OCC) where the securities may be options. The OMS 134 also formats the quote and sale update information and sends that information through an internal distribution system that refreshes display screens on the floor, in addition to submitting the information to a quote dissemination service such as, in the case of options, the Options Price Reporting Authority (OPRA).

FIG. 2 is a diagram of an on-demand auction process. In more detail, FIG. 2 depicts an example of an exchange computer system executing an on-demand auction. In the depicted example, the exchange computer system 110 performs the on-demand auction process within the trading environment depicted and described in association with FIG. 1.

The process begins with step 202, in which the exchange computer system 110 receives, from a user device, a security transaction order that includes an auction request. The exchange computer system 110 may receive, for example, a sell order for a particular financial instrument, from user device 116.

The process continues with step 204, in which the exchange computer system 110 receives a first matching order. The exchange computer system 110 may, for example, almost immediately receive a buy order for the same financial instrument, from a user device 118 engaged in algorithmic trading. The OMS 134 can determine, based on matching rules, whether a received order matches the security transaction order. For example, the OMS 134 can determine that the buy and sell orders relate to the same financial instrument, and that the buy order price is for at least the amount of the sell order.

The process continues with step 206, in which the exchange computer system 110 initiates a delay timer 138 that runs for a first period of time. The first period of time can be a delay period during which no activity associated with the security transaction order occurs. The delay period can last for a fixed amount of time (e.g., a predetermined number of milliseconds). Alternatively, the first period of time can be determined using a variety of different processes (e.g., based on a pseudorandom process and/or parameters included in the security transaction order itself). In some implementations, the exchange computer system 110 may continue to receive orders during the first period of time, and may handle orders received during the first period of time outside of the auction process.

In some implementations, the auction engine 136 initiates the delay timer 138 to run for the first period of time in response to receiving the security transaction order. In other implementations, the auction engine 136 initiates the delay timer 138 to run for the first period of time in response to receiving the first matching order.

The process continues with step 208, in which the exchange computer system 110 determines whether the first period of time has expired. The determination may be made based on the delay timer 138 and, if the first period of time has expired, the process will continue to step 210.

The process continues with step 210, in which the exchange computer system 110 initiates an auction timer 140 that runs for a second period of time. The second period of time may be, for example, a period of time during which the auction engine 136 facilitates bidding related to the security transaction order.

The auction engine 136 can initiate the auction timer 140 to run for a fixed amount of time (e.g., a predetermined number of milliseconds). Alternatively, the second period of time can be determined using a variety of different processes (e.g., based on a pseudorandom process and/or parameters included in the security transaction order itself). In some implementations, and as an alternative to initiating an auction timer, auction engine 136 may maintain an auction timer, and may set the second period of time based on a value associated with the maintained timer.

In some implementations, the auction engine 136 initiates the auction timer 140 to run for the second period of time in response to determining that the first period of time has expired. In other implementations, the exchange computer system 110 receives the first matching order during the second period of time.

The process continues with step 212, in which the exchange computer system 110 receives one or more additional matching orders that are flagged for participation in the auction. For example, and as determined by OMS 134, the auction engine 136 may receive, from user devices 118 and 120, two additional orders that match the security transaction order that included the auction request. In some examples, information associated with the security transaction order, the first matching order, and the one or more additional matching orders that are received during the second period of time is held in storage 144.

The process continues with step 214, in which the exchange computer system 110 determines whether the second period of time has expired. If the second period of time has not expired, the process continues with step 212. If the second period of time has expired, the process continues with step 216. Auction engine 136 can, for example, determine whether the second period of time has expired based on auction timer 140.

In step 216, the exchange computer system 110 facilitates a transaction based on the security transaction order. Facilitating a transaction based on the security transaction order can include selecting a matching order from among a set of matching orders. Auction engine 136 may, for example, determine a price of the first matching order and of each of the one or more additional matching orders that were received during the second period of time, and may then select a matching order based on the determined prices. The determination of price for each order may be based on information that is associated with the order. An order may, for example, include parameters such as type, price, size, and duration, and the auction engine 136 may determine the price of an order by identifying the price that was included with the order.

After selecting a matching order based on the determined prices, auction engine 136 may execute a transaction based on the selected matching order and the security transaction order.

Once the exchange computer system 110 has facilitated the transaction based on the security transaction order, the process may continue by returning to step 202. The exchange computer system 110 may, for example, receive a second security transaction order including an auction request, and auction engine 136 may facilitate a second auction based on receipt of the second security transaction order.

In some implementations, the on-demand auction process can proceed as described above, but without step 206, in which the auction engine 136 initiates a delay timer 206. For example, the on-demand auction process can proceed without any period of delay between auctions.

Figure 3A:
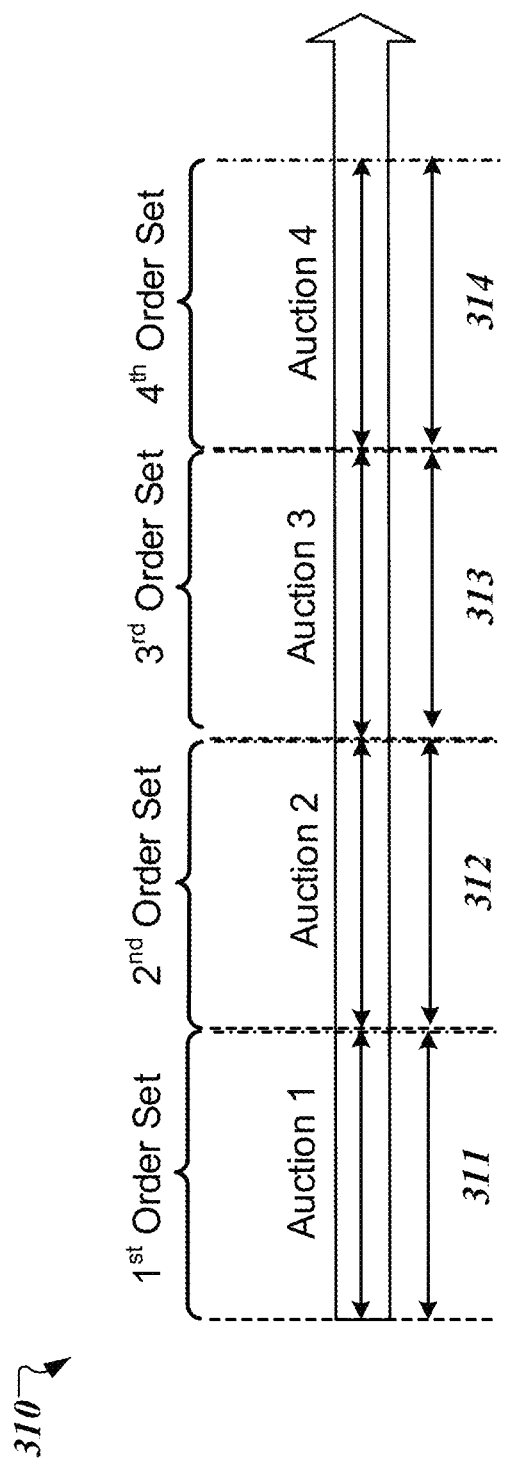
FIGS. 3A-3D are example data flows for executing on-demand auctions.

FIG. 3A is an example data flow 310 for executing an on-demand auction in the example trading environment of FIG. 1. Operations of the data flow 310 are performed by the exchange computer system 110. In this particular example, the auction engine 136 facilitates consecutive auctions of static length, and does not rely on matching orders to begin associated auction timers.

In example data flow 310, periodic auctions run consecutively, and as soon as one auction period ends, a new auction period begins. For example, the auction engine 136 can initiate an auction timer 312 for auction 2 as soon as an auction timer 311 for auction 1 ends.

Offers associated with a particular auction may accumulate within the corresponding auction period. For example, during each of periods 311, 312, 313, and 314, the auction engine 136 may receive sets of orders associated with the auctions 1, 2, 3, and 4, respectively. If, for example, the auction engine 136 receives an order during one of the auction periods 311, 312, 313, or 314, the order will be considered in the corresponding auction 1, 2, 3, or 4.

Figure 3B:
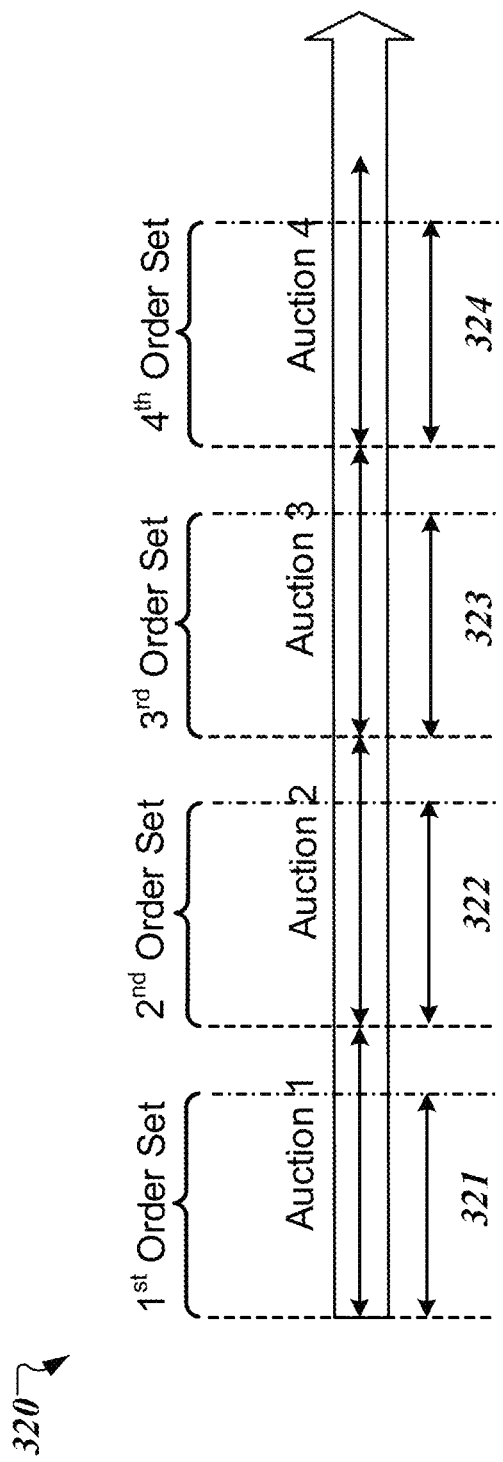

FIG. 3B is an example data flow 320 for executing an on-demand auction in the example trading environment of FIG. 1. Operations of the data flow 320 are performed by the exchange computer system 110. In this particular example, the auction engine 136 facilitates consecutive auctions of static length. Although the auctions associated with this example are of a predetermined static length, auction engine 136 may determine the length of subsequent auctions pseudorandomly, and/or on the basis of factors that include trading day, or order parameters such as type, price, size, or duration. The length of auctions administered by auction engine 136 may, for example, change from one trading day to the next.

Static auction lengths can also be implemented without reliance on a matching order. Similar to data flow 310, offers associated with a particular auction in data flow 320 may accumulate within the corresponding auction period. If, for example, the auction engine 136 receives an order during one of the auction periods 321, 322, 323, or 324, the order will be considered in the corresponding auction 1, 2, 3, or 4.

However, in data flow 320, the auction engine 136 administers a threshold or cutoff time for submission of orders within each auction. The order submission cutoff time may, for example, occur after some percentage of time has passed within the corresponding auction. In such an implementation, if an order is received during an auction but after a cutoff time reflected in the corresponding auction period, the order may be held for consideration in a supplemental, or subsequent, auction. If, for example, an order is received during auction 1 but after the conclusion of auction period 321, the order may be held for consideration during auction 2.

Information associated with a held order may be stored, for example, in storage 144, and the stored information may be accessed for processing by auction engine 136 during a subsequent auction.

Figure 3C:
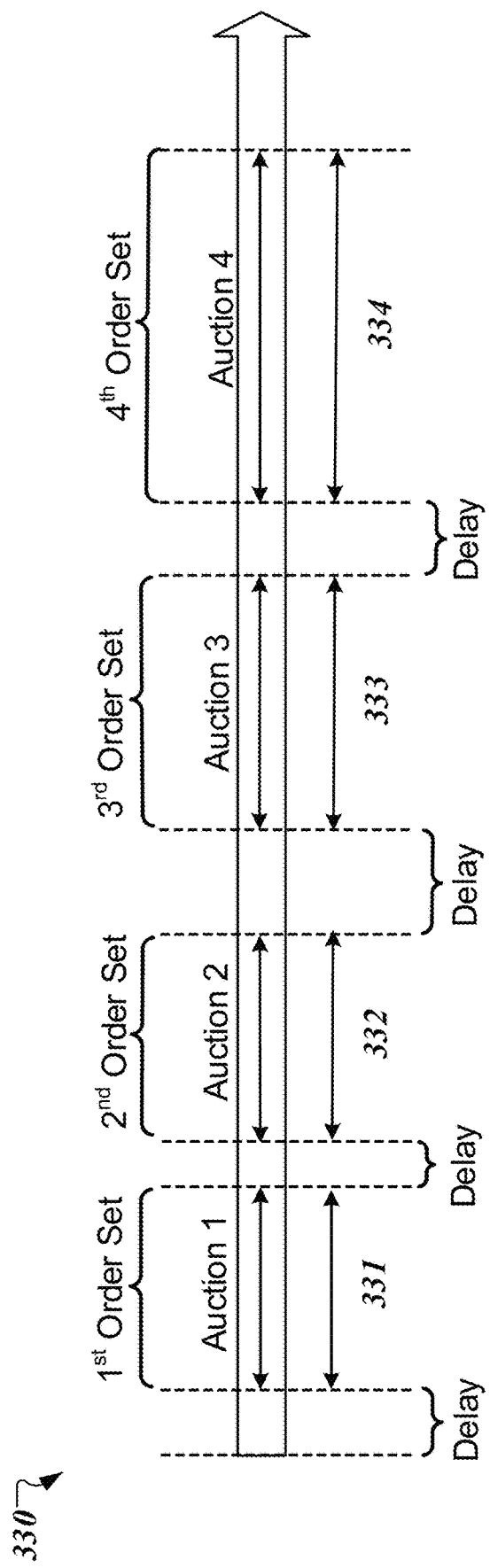

FIG. 3C is an example data flow 330 for executing an on-demand auction in the example trading environment of FIG. 1. Operations of the data flow 330 are performed by the exchange computer system 110. In this particular example, auction engine 136 facilitates periodic auctions of variable length, with delays of variable length between the auctions, and does not rely on matching orders to begin delay or auction timers.

Similar to data flows 310 and 320, offers associated with a particular auction may accumulate within the corresponding auction period. If, for example, the auction engine 136 receives an order during one of the auction periods 331, 332, 333, or 334, the order will be considered in the corresponding auction 1, 2, 3, or 4.

However, in data flow 330, the auction engine 136 administers a delay of variable length between each auction. The length of a given delay may, for example, be determined pseudorandomly, and/or on the basis of factors that include trading day, or order parameters such as type, price, size, or duration. In some instances, a delay may be of zero length.

In more detail, and as depicted in data flow 330, there are delays of different lengths prior to each of auctions 1, 2, 3, and 4. The auction engine 136 may, for example, run a delay timer between the end of auction 1's auction period 331, and the beginning of auction 2's auction period 332. Auction engine may then, for example, start an auction timer associated with auction period 332 after the expiration of the prior period of delay.

Moreover, and as depicted in data flow 330, the auction engine 136 administers auctions such that the length of each auction varies. The length of a given auction may, for example, be determined pseudorandomly, and/or on the basis of factors that include trading day, or order parameters such as type, price, size, or duration.

In some implementations, auction engine 136 may maintain, for each auction, a corresponding auction timer. In other implementations, auction engine 136 may maintain a master auction timer, and may determine the length of a particular auction based on the state of the master auction timer. Auction engine 136 may, for example, determine the length of an auction on the basis of the master auction timer, at the time that it receives the corresponding auction request.

The master auction timer may, for example, run for a period of 100 milliseconds, reset, and then run again for the same period of time, with this cycle of running and resetting being continuously repeated. Alternatively, the period of time for which the master auction timer runs may vary between each reset. The period of time for which the master auction timer runs may, for example, be determined pseudorandomly.

In implementations involving a master auction timer, auction engine 136 may determine the length of a particular auction by checking the time remaining on the master auction timer, comparing the time remaining to a threshold value, and, if the time remaining is greater than the threshold value, setting the auction length to the time remaining. If, on the other hand, the time remaining is determined to be less than the threshold value, auction engine 136 might set the auction length to equal the time remaining, plus some additional period of time. Alternatively, if the time remaining is determined to be less than the threshold value, auction engine 136 might delay the start of the auction, and set the auction length to equal the time remaining at the next reset of the master auction timer.

Figure 3D:
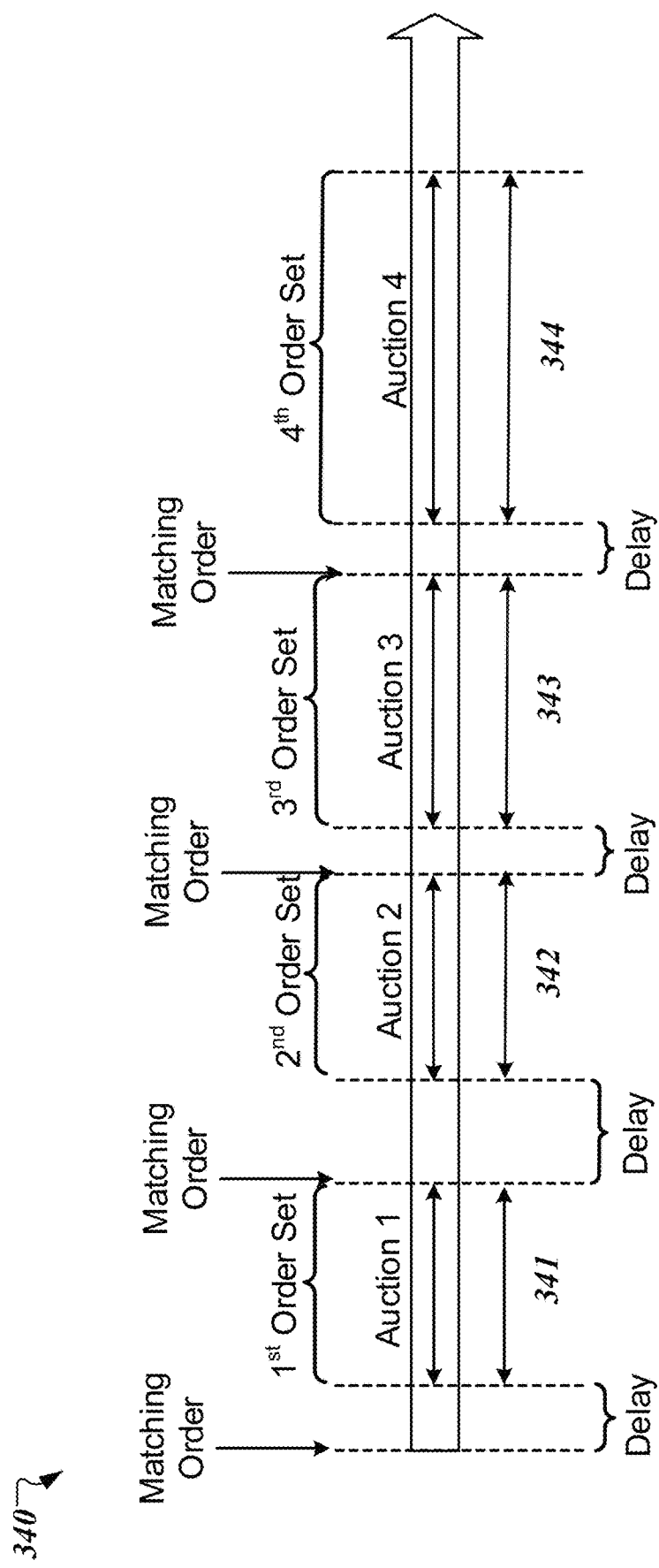

FIG. 3D is an example data flow 340 for executing an on-demand auction in the example trading environment of FIG. 1. Operations of the data flow 360 are performed by the exchange computer system 110. In this particular example, the auction engine 136 facilitates periodic auctions of variable length with delays of variable length between the auctions. Each delay is initiated in response to receiving an order that matches another order that included an auction request. In data flow 340, for example, the auction engine 136 initiates a delay timer prior to auction 1, in response to receiving a first order that matches a security transaction order that included an auction request. Following the expiration of the delay, auction engine 136 notifies market participants of the existence of auction 1, and initiates an auction timer for auction 1. Orders associated with auction 1 may accumulate within period 341 and, after that period's conclusion, auction engine 136 facilitates a transaction based on the order that included the auction request, the first matching order, and any additional orders that accumulated during auction 1.

Although not depicted, in some implementations, auctions administered by auction engine 136 can overlap. For example, a delay timer for one auction can run while a delay timer for another auction is running, and an auction timer for one auction can run while an auction timer for another auction is running. In such implementations, exchange computer system 110 can maintain multiple sets of timers. Each auction can, for example, be associated with its own delay timer 138 and auction timer 140, such that any number of additional auctions can be run separately.

Particular implementations have been described, but other implementations are within the scope of the following claims.

We claim:

1. A method implemented via an exchange computer system for minimizing technological advantages possessed by some market participants over others by deemphasizing importance of order entry speed in trading, the method comprising:

receiving, from a user device, a security transaction order that includes an auction request;

receiving, from a first device, a first matching order that includes a request for participation in the auction, wherein the first device is remote from the exchange computer system, and wherein the first device is configured for high-speed algorithmic trading;

obtaining a random signal specifying information for a delay timer in response to receiving the first matching order, wherein the random signal is obtained from a device with which the exchange computer system communicates over a network;

determining a first time period of time for the delay timer based on the information specified by the random signal;

initiating the delay timer that runs for the first period of time;

determining that the first period of time has expired;

responsive to determining that the first period of time has expired, initiating (i) an auction associated with the security transaction order and the first matching order and (ii) an auction timer that limits the auction to run for a second period of time;

receiving, during the second period of time, one or more additional matching orders from one or more additional devices, wherein the one or more additional devices are not configured for high-speed algorithmic trading, wherein each of the one or more additional matching orders includes a request for participation in the auction, and wherein each of the one or more additional devices is remote from the exchange computer system;

determining that the second period of time has expired;

determining a price of the first matching order;

determining a price of each of the one or more additional matching orders received during the second period of time;

determining a best-priced matching order based on the price of the first matching order and the price of each of the one or more additional matching orders; and facilitating, by one or more processors, a transaction based on the security transaction order and the best-priced matching order, thereby ensuring that the security transaction order trades with the best-priced matching order, which is not the first matching order received from the first device.

2. The method of claim 1, wherein the exchange computer system is a distributed computer system comprising an order routing system, an order matching system, and an auction engine;

wherein the security transaction order that includes an auction request is received by the order routing system;

wherein the order routing system forwards the security transaction order to the order matching system;

wherein the first matching order that includes a request for participation in the auction is received by the order routing system;

wherein the order routing system forwards the first matching order to the order matching system;

wherein the order matching system determines that the first matching order matches the security transaction order;

wherein the auction engine initiates the delay timer that runs for a first period of time in response to the determination that the first matching order matches the security transaction order;

wherein the auction engine initiates the auction timer that runs for a second period of time in response to the determination that the first period of time has expired; and wherein the order matching system facilitates the transaction based on the security transaction order in response to the determination that the second period of time has expired.

3. The method of claim 1, wherein the delay timer that runs for a first period of time is initiated in response to receiving the security transaction order.

4. The method claim 1, wherein the delay timer that runs for a first period of time is initiated in response to receiving the first matching order.

5. The method of claim 1, wherein a length of the first period of time is predetermined.

6. The method of claim 1, further comprising:
determining a length of the first period of time based on a pseudorandom process.

7. The method of claim 1, further comprising:
determining a length of the first period of time based on a trading day.

8. The method of claim 1, wherein a length of the second period of time is predetermined.

9. The method of claim 1, further comprising:
determining a length of the second period of time based on a pseudorandom process.

10. The method of claim 1, further comprising:
determining a length of the second period of time based on a trading day.

11. The method of claim 1, further comprising:
determining a length of the second period of time based on one or more parameters associated with the security transaction order.

12. The method of claim 1, wherein the determination that the first period of time has expired is based on the delay timer, and wherein the auction timer that runs for a second period of time is initiated in response to determining that the first period of time has expired.

13. The method of claim 1, wherein the determination that the second period of time has expired is based on the auction timer, and wherein the transaction based on the security transaction order is facilitated in response to determining that the second period of time has expired.

14. The method of claim 13, further comprising:
reinitiating the auction timer in response to each of the one or more additional matching orders received during the second period of time.

15. The method of claim 13, further comprising:
receiving, during a third period of time, one or more supplementary matching orders; and
holding each of the of the one or more supplementary matching orders received during the third period of time for a supplementary auction.

16. The method of claim 15, wherein a length of the third period of time is determined based on a length of the second period of time.

17. The method of claim 1, wherein the first matching order is received during the second period of time.

18. The method of claim 1, wherein facilitating a transaction based on the security transaction order comprises:
    determining a price of the first matching order;
    determining a price of each of the one or more additional matching orders received during the second period of time;
    selecting a matching order based on price; and
    executing the transaction based on the security transaction order and the selected matching order.

19. The method of claim 18, wherein the selected matching order is selected from the group consisting of the first matching order and the one or more additional matching orders received during the second period of time.

20. The method of claim 1, wherein the exchange computer system is a distributed computer system comprising:
    an order routing system; and
    an order matching system comprising an auction engine.

21. A method for implemented via an exchange computer system for minimizing technological advantages possessed by some market participants over others by deemphasizing importance of order entry speed in trading, the method comprising:
    receiving, from a user device, a security transaction order that includes an auction request;
    receiving a first matching order from a first device, wherein the first device is configured for high-speed algorithmic trading;
    obtaining a random signal specifying information for a first delay timer in response to receiving the first matching order, wherein the random signal is obtained from a device with which the exchange computer system communicates over a network;
    determining a first time period of time for the first delay timer based on the information specified by the random signal;
    in response to receiving the first matching order, initiating the first delay timer that runs for a first period of time;
    determining, based on the first delay timer, that the first period of time has expired;
    in response to determining that the first period of time has expired, initiating (i) an auction associated with the security transaction order and the first matching order and (ii) an auction timer that limits the auction to run for a second period of time;
    receiving, during the second period of time, one or more additional matching orders from one or more additional devices, wherein the one or more additional devices are not configured for high-speed algorithmic trading;
    determining, based on the auction timer, that the second period of time has expired;
    in response to determining that the second period of time has expired:
        determining a price of the first matching order;
        determining a price of each of the one or more additional matching orders received during the second period of time;
        determining a best-priced matching order based on the price of the first matching order and the price of each of the one or more additional matching orders;
        selecting a matching order based on the best-priced matching order; and
        executing the transaction based on the security transaction order and the selected matching order, thereby ensuring that the security transaction order trades with the best-priced matching order, which is not the first matching order received from the first device.

22. The method of claim 21, wherein determining a price of the first matching order comprises identifying the price of the first matching order based on information that is associated with the first matching order, and
    wherein determining a price of each of the one or more additional matching orders received during the second period of time comprises, for each of the one or more additional matching orders received during the second period of time:
    identifying a price of the additional matching order based on information that is associated with the additional matching order.

23. The method of claim 21, wherein receiving the first matching order comprises:
    receiving an order;
    identifying a price of the order based on information that is associated with the order; and
    determining, based on the price of the order, that the order matches the security transaction order.

24. A method for implemented via an exchange computer system for minimizing technological advantages possessed by some market participants over others by deemphasizing importance of order entry speed in trading, the method comprising:
    receiving, from a user device, a first security transaction order;
    receiving a first matching order from a first device, wherein the first device is configured for high-speed algorithmic trading;
    subsequent to receiving the first matching order:
        initiating (i) a first auction associated with the first security transaction order and the first matching order and (ii) a first auction timer that limits the first auction to run for a first period of time;
        receiving, during the first period of time, one or more additional matching orders from a first set of one or more additional devices, wherein the first set of one or more additional devices are not configured for high-speed algorithmic trading;
        determining that the first period of time has expired;
        determining a price of the first matching order;
        determining a price of each of the one or more additional matching orders received during the first period of time;
        determining a first best-priced matching order based on the price of the first matching order and the price of each of the one or more additional matching orders received during the first period of time; and
        facilitating, by one or more processors, a transaction based on the first security transaction order and the first best-priced matching order, thereby ensuring that the first security transaction order trades with the first best-priced matching order, which is not the first matching order received from the first device;
    receiving a second security transaction order;
    receiving a second matching order from a second device, wherein the second device is configured for high-speed algorithmic trading;
    subsequent to receiving the second matching order:
        initiating (i) a second auction associated with the second security transaction order and the second matching order and (ii) a second auction timer that limits the second auction to run for a second period of time;

receiving, during the second period of time, one or more additional matching orders from a second set of one or more additional devices, wherein the second set of one or more additional devices are not configured for high-speed algorithmic trading;

determining that the second period of time has expired;

determining a price of the second matching order;

determining a price of each of the one or more additional matching orders received during the second period of time;

determining a second best-priced matching order based on the price of the second matching order and the price of each of the one or more additional matching orders received during the second period of time; and facilitating a transaction based on the second security transaction order and the second best-priced matching order, thereby ensuring that the second security transaction order trades with the second best-priced matching order, which is not the second matching order received from the second device.

25. The method of claim 24, further comprising:
receiving, during a third period of time, one or more supplementary matching orders, wherein at least a portion of the third period of time occurs during the first period of time.

26. The method of claim 25, wherein a length of the third period of time is determined based on a length of the first period of time.

27. The method of claim 25, wherein facilitating a transaction based on the second security transaction order comprises:
determining a price of the second matching order;
determining a price of each of the one or more additional matching orders received during the second period of time;
determining a price of each of the one or more supplementary matching orders received during the third period of time;
selecting a matching order based on price; and
executing the transaction based on the second security transaction order and the selected matching order.

28. The method of claim 27, wherein the selected matching order is selected from the group consisting of the second matching order, the one or more additional matching orders received during the second period of time, and the one or more supplementary matching orders received during the third period of time.

29. The method of claim 24, wherein at least a portion of the second period of time occurs during the first period of time.

30. A method implemented via an exchange computer system for minimizing technological advantages possessed by some market participants over others by deemphasizing importance of order entry speed in trading, the method comprising:
maintaining an auction timer configured to limit time periods for which auctions are run;
receiving, from a user device, a security transaction order;
receiving a first matching order from a first device, wherein the first device is configured for high-speed algorithmic trading;
obtaining a random signal specifying information for a delay timer in response to receiving the first matching order, wherein the random signal is obtained from a device with which the exchange computer system communicates over a network;
determining a first time period of time for the delay timer based on the information specified by the random signal;
initiating the delay timer that runs for the first period of time;
determining that the first period of time has expired;
responsive to determining that the first period of time has expired:
  determining a second period of time based on the auction timer; and
  initiating an auction associated with the security transaction order and the first matching order, wherein the auction is limited by the auction timer to run for the second period of time;
receiving, during the second period of time, one or more additional matching orders from one or more additional devices, wherein the one or more additional devices are not configured for high-speed algorithmic trading;
determining that the second period of time has expired;
determining a price of the first matching order;
determining a price of each of the one or more additional matching orders received during the second period of time;
determining a best-priced matching order based on the price of the first matching order and the price of each of the one or more additional matching orders; and
facilitating, by one or more processors, a transaction based on the security transaction order and the best-priced matching order, thereby ensuring that the security transaction order trades with the best-priced matching order, which is not the first matching order received from the first device.

31. The method of claim 30, wherein determining a second period of time based on the auction timer comprises:
determining a time remaining from the auction timer;
comparing the time remaining to a threshold value; and
setting the second period of time to the time remaining.

32. The method of claim 31, wherein the time remaining is greater than the threshold value.

33. The method of claim 30, wherein determining a second period of time based on the auction timer comprises:
determining a time remaining from the auction timer;
comparing the time remaining to a threshold value; and
setting the second period of time to the time remaining plus an additional period of time.

34. The method of claim 33, wherein the time remaining is less than the threshold value.

35. The method of claim 30, wherein each of the one or more additional matching orders includes a request for participation in the auction.

* * * * *